(12) United States Patent
Kinser

(10) Patent No.: US 9,746,095 B2
(45) Date of Patent: Aug. 29, 2017

(54) APPARATUS TO ATTACH A FLUID VALVE BONNET

(71) Applicant: Fisher Controls International LLC, Marshalltown, IA (US)

(72) Inventor: Andrew John Kinser, State Center, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 296 days.

(21) Appl. No.: 13/944,499

(22) Filed: Jul. 17, 2013

(65) Prior Publication Data

US 2015/0021506 A1 Jan. 22, 2015

(51) Int. Cl.
*F16K 27/04* (2006.01)
*F16K 27/02* (2006.01)
*F16K 27/00* (2006.01)

(52) U.S. Cl.
CPC ............ *F16K 27/041* (2013.01); *F16K 27/02* (2013.01); *F16K 27/00* (2013.01); *F16K 27/04* (2013.01)

(58) Field of Classification Search
CPC .......... F16K 27/04; F16K 27/00; F16K 27/02; F16K 27/041
USPC .................................. 137/454.6; 70/175–180
See application file for complete search history.

(56) References Cited

U.S. PATENT DOCUMENTS

| | | | | |
|---|---|---|---|---|
| 1,331,025 A | * | 2/1920 | Riggin | 251/86 |
| 2,770,475 A | * | 11/1956 | Rafferty | 285/94 |
| 2,863,631 A | * | 12/1958 | Boteler | 251/331 |
| 2,884,981 A | * | 5/1959 | Wurzburger | 411/143 |
| 3,257,097 A | * | 6/1966 | Boteler | 251/331 |
| 3,300,844 A | * | 1/1967 | Boteler | 29/890.122 |
| 3,871,667 A | | 3/1975 | Thompson | |
| 4,344,454 A | | 8/1982 | Chan | |
| 4,968,002 A | * | 11/1990 | Gibson et al. | 251/266 |
| 5,183,273 A | * | 2/1993 | Dennys | F16J 15/30 251/214 |
| 6,932,321 B2 | | 8/2005 | Baumann | |
| 7,387,292 B1 | | 6/2008 | Fleming | |
| 8,297,316 B2 | | 10/2012 | Wears | |
| 2003/0097879 A1 | * | 5/2003 | van Klooster | B06B 3/00 73/861.18 |
| 2004/0055480 A1 | * | 3/2004 | Hellgren | B30B 5/02 100/269.04 |
| 2006/0151959 A1 | * | 7/2006 | Meller | F16J 9/08 277/493 |
| 2006/0191777 A1 | * | 8/2006 | Glime | 200/81 R |
| 2007/0215032 A1 | * | 9/2007 | Melberg | G01K 5/62 116/218 |
| 2009/0020720 A1 | | 1/2009 | Davie, Jr. et al. | |

(Continued)

OTHER PUBLICATIONS

Emerson Process Management, "Fisher GX 3-Way Control Valve and Actuator System," Product Bulletin, Aug. 2011 (pp. 1-22).

(Continued)

*Primary Examiner* — Michael R Reid
*Assistant Examiner* — Christopher Ballman
(74) *Attorney, Agent, or Firm* — Hanley, Flight & Zimmerman, LLP

(57) ABSTRACT

Apparatus to attach a fluid valve bonnet are disclosed. The apparatus includes a bonnet having a neck portion and a nut engaged with the neck portion of the bonnet to couple the bonnet to a body of a fluid valve. A central axis of the nut is coaxial to a longitudinal axis of the bonnet.

24 Claims, 4 Drawing Sheets

(56) References Cited

U.S. PATENT DOCUMENTS

2012/0261890 A1  10/2012  Hageman et al.
2013/0019683 A1   1/2013  Carder et al.

OTHER PUBLICATIONS

Emerson Process Management, "Control Valve Handbook," Fisher, 4th Ed., 2005 (297 pages).

* cited by examiner

APPARATUS TO ATTACH A FLUID VALVE BONNET

TECHNICAL FIELD

The present disclosure pertains to fluid valves and, more particularly, to apparatus to attach a fluid valve bonnet.

BACKGROUND

Valves are commonly used in process control systems to manipulate a flow of fluid. In general, fluid flow through a valve is controlled by adjusting the position of a control element or member (e.g., a plug) with respect to a valve seat. For example, a valve (e.g., a sliding stem valve) may include an actuator coupled to the control member via a valve stem so that force is transmitted from the actuator to change the position of the control member.

A fluid valve bonnet typically includes a mounting surface for the actuator and an opening through which the valve stem moves. A bonnet assembly may further include a packing assembly to prevent leakage around the valve stem and a seal to prevent leakage between the bonnet and the valve body.

It is often desirable to be able to remove and reinstall the bonnet so that valve components can be repaired or replaced without having to remove the valve from its connection to adjacent pipes. As such, bonnets are frequently connected to valve bodies using bolted or threaded connections, which allow the bonnet to be removed and subsequently reattached. This connection may further provide a force to pre-load the bonnet/valve body seal to optimize sealing characteristics.

SUMMARY

An example apparatus includes a bonnet for a fluid valve. A nut is engaged with a neck portion of the bonnet to couple the bonnet to a body of the fluid valve, and a central axis of the nut is coaxial to a longitudinal axis of the bonnet.

Another example apparatus includes a bonnet of a fluid valve and a body of the fluid valve having an annular seating surface surrounding a neck portion of the bonnet. A nut is engaged with the bonnet to couple the bonnet to the body, and a face of the nut abuts the annular seating surface of the body.

Another example apparatus includes means for sealing a fluid valve and a means for coupling a bonnet of the fluid valve to a body of the fluid valve. The means for coupling provides an axial pre-load force to the means for sealing. The axial pre-load force is coaxial to a central axis of the means for sealing.

DETAILED DESCRIPTION

Fluid valves often utilize multiple bolts to connect a bonnet to a valve body. Tightening or torquing the bolts unequally may result in binding or misalignment of the bonnet with respect to the valve body, and/or unbalanced loading along the circumference of the seal. Consequentially, a portion of the seal may be over-compressed, which may damage the seal or shorten its working life, and/or a portion of the seal may be under-compressed, which may result in an inadequate seal and cause leakage.

Generally, the example apparatus to attach a fluid valve bonnet described herein substantially eliminates unbalanced loading across the circumference of a seal between a bonnet and a valve body, and binding and misalignment between a bonnet and a valve body.

Figure 1:
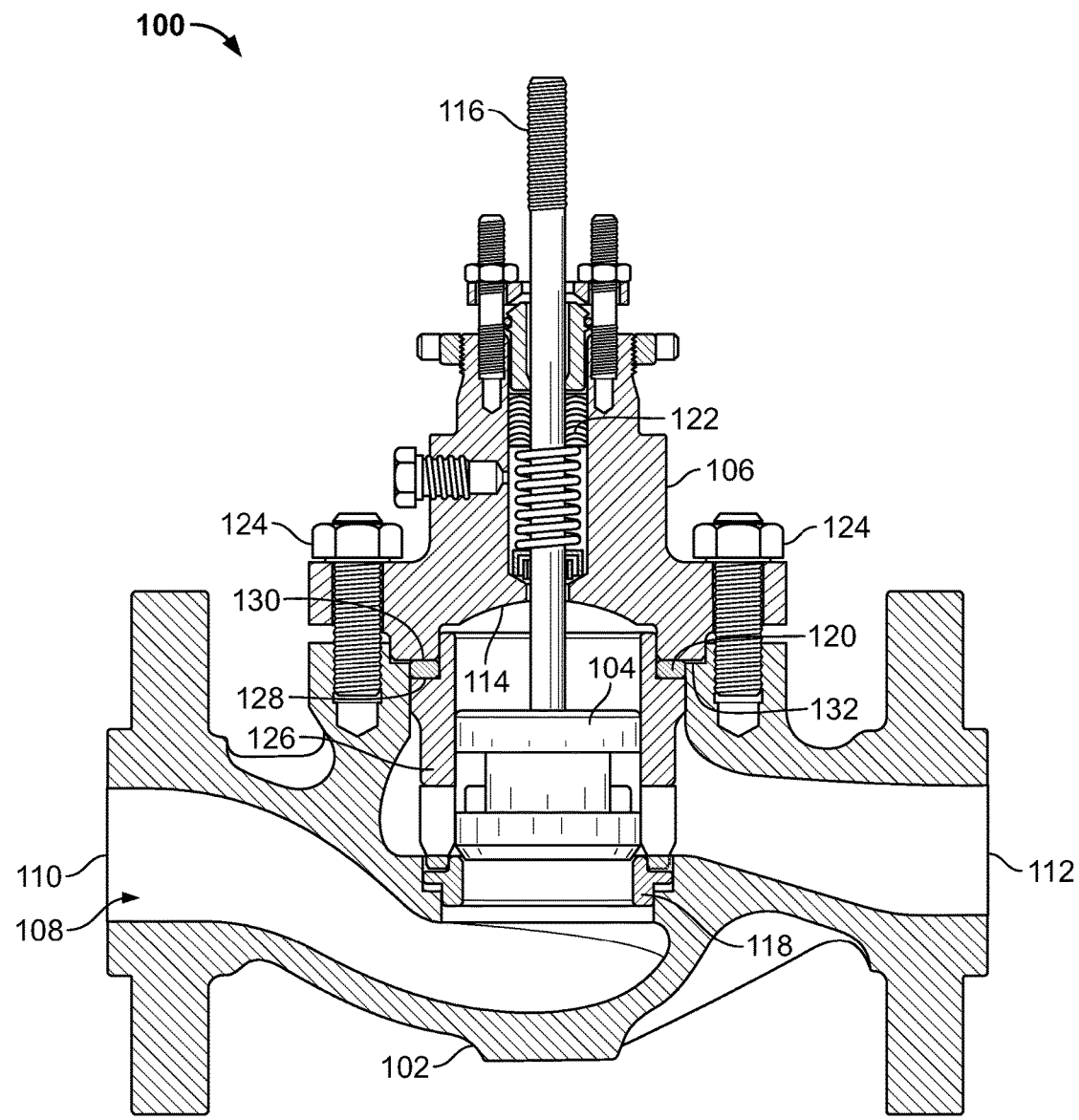
FIG. 1 is a partial cross-sectional view of a known fluid valve.

Before describing the example apparatus to attach a fluid valve bonnet as mentioned above, a brief description of a known fluid valve is provided below in connection with FIG. 1. FIG. 1 illustrates an example of a known fluid valve 100, which includes a valve body 102, a control member 104, and a bonnet 106. The valve body 102 defines a fluid flow path 108 from an inlet 110 to an outlet 112.

The control member 104 is disposed within a cavity 114 of the valve body 102 and is operatively coupled to a valve stem 116. The valve stem 116 is operatively coupled to an actuator (not shown), which transmits force to the control member 104 to change the position of the control member 104 within the cavity 114 and thereby modify the rate of fluid flow through the valve body 102. To close the valve 100, the control member 104 engages a seat ring 118, thereby preventing fluid flow through the valve body 102.

The valve bonnet 106 engages a seal 120 to seal the valve body 102 from the ambient environment and retain pressure within the valve body 102. The bonnet 106 further retains a valve packing 122, which seals against leakage around the valve stem 116. The bonnet 106 may also provide a mounting surface for an actuator (not shown). The most common type of valve bonnet is the bolted type depicted in FIG. 1 in which the bonnet 106 is attached to the valve body 102 by two or more bolts 124. A valve cage 126 disposed within the valve body 102 has an annular channel 128 to retain the seal 120. As the bonnet 106 is attached to the valve body 102, the seal 120 is compressed between the annular channel 128 of the valve cage 126 and a flange 130 on the bonnet 106. The valve body 102 further includes a shoulder 132, which provides a stop for the flange 130 of the bonnet 106 to control the compression of the seal 120. The channel 128 and the flange 130 are sized so that the bonnet 106 is tightened until the flange 130 on the bonnet 106 abuts the shoulder 132 on the valve body 102, which compresses the seal 120 by a desired amount, thereby pre-loading the seal 120.

In practice, the bonnet 106 is attached to the valve body 102 by sequentially and incrementally tightening each of the bolts 124 until each of the bolts 124 reaches its desired final tightness or torque. However, this tightening sequence may lead to disproportionate or unequal tightening of one or more of the bolts 124. Unequal tightening of the bolts 124 may cause unbalanced or asymmetric seal compression in which one portion of the seal 120 may be over-compressed and/or another portion may be under-compressed. Over-compressing the seal 120 may damage it and/or may shorten its working life, while under-compressing the seal 120 may result in inadequate sealing capabilities. Unequal tightening of the bolts 124 may further lead to binding or misalignment of the bonnet 106 with respect to the valve body 102. This may damage portions of the bonnet 106, the valve body 102 and/or the valve cage 126.

Still further, because the seal 120 shown in FIG. 1 is pre-loaded by multiple bolts 124, the pre-load force on the seal 120 is inherently asymmetric as the force imparted by the bolts 124 is not coaxial to a central axis of the seal 120. Thus, the seal 120 may exhibit some amount of asymmetric pre-loading even if the bolts 124 could be tightened equally.

Figure 2:
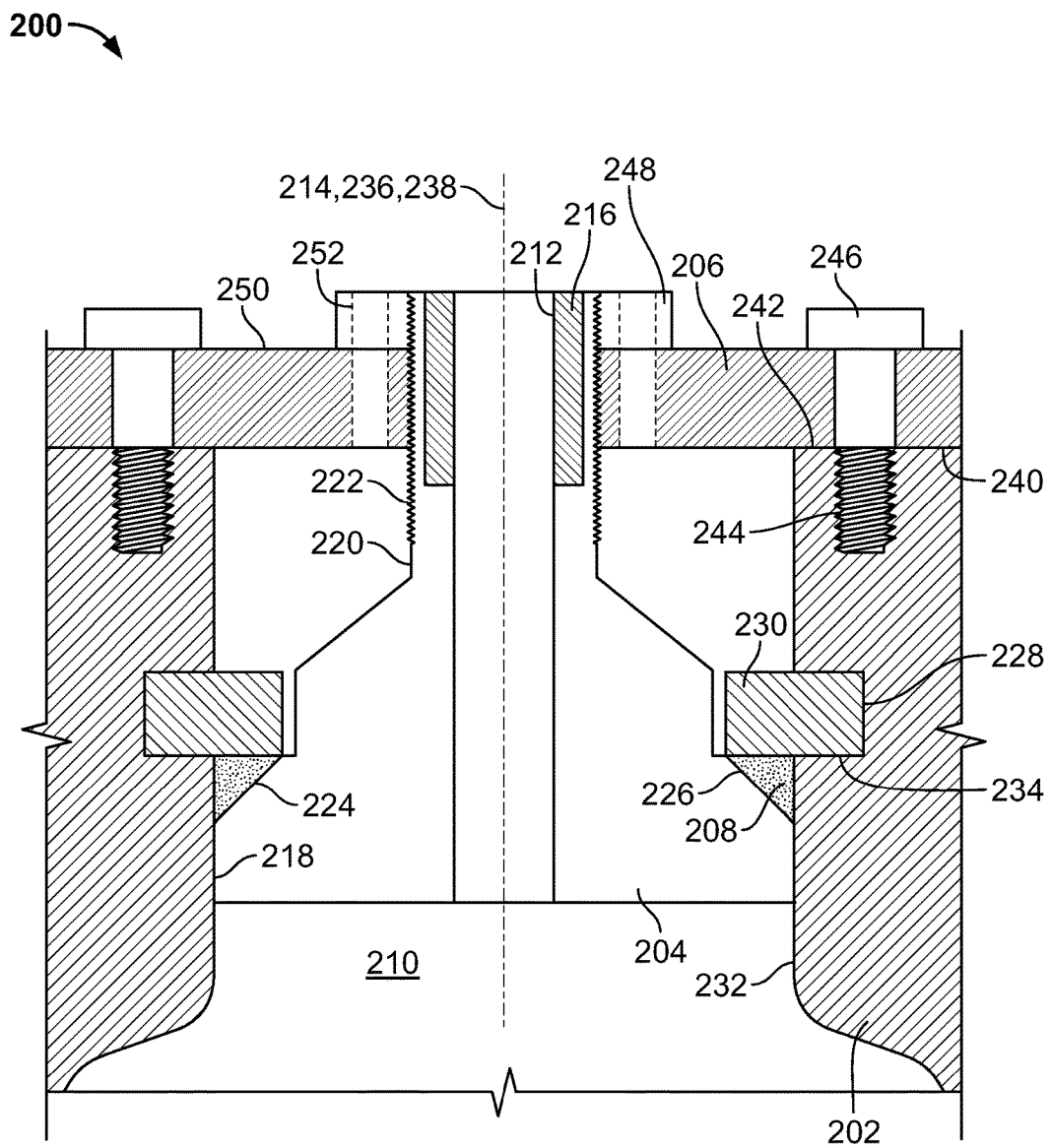
FIG. 2 is a partial cross-sectional view of an example fluid valve including an example bonnet and nut.

Referring now to FIG. 2, a partial cross-sectional view of an example fluid valve 200 in accordance with the teachings of this disclosure is depicted. For clarity, components such as a valve stem and a fluid control member, for example, are not shown in FIG. 2. The example fluid valve 200 depicted in FIG. 2 is a sliding-stem valve, which may control fluid flow through a valve body 202 in a manner similar to the fluid valve 100 described above. However, the teachings of this disclosure may be similarly applied to other types of valves.

The example fluid valve 200 includes the valve body 202, a bonnet 204, and a nut 206 that couples the bonnet 204 to the valve body 202. The bonnet 204 may compress a seal 208 to seal an internal cavity 210 of the valve body 202 from the ambient environment and to retain pressure within the internal cavity 210. The bonnet 204 is removable, which allows a user to access components in the internal cavity 210 so that these components may be repaired or replaced without having to remove the entire fluid valve 200 from connections to surrounding pipes or other components. The bonnet 204 also defines a cylindrical aperture 212 that extends along a longitudinal axis 214, through which a valve stem (not shown) may travel. A valve packing 216 seals against fluid leakage around the valve stem.

The bonnet 204 is generally symmetrical about its longitudinal axis 214 and may include a flange portion 218 and a neck portion 220, which may include threads 222. The flange portion 218 further may include an annular angled seal surface 224, which is shaped to receive an angled face 226 of the seal 208. The seal 208, as depicted in FIG. 2, is generally ring-shaped and has a substantially triangular cross-section. However, the geometry of the seal 208 is not limited to this particular shape. For example, the seal 208 may include chamfered edges to accept anti-extrusion wire rings. The seal 208 may be formed from Teflon, graphite, spiral-wound metal, or other types of metals or polymers, for example.

The valve body 202 extends downward in the orientation of FIG. 2 and defines a fluid flow path therethrough. The valve body 202 includes an annular recess 228 to retain a segmented ring 230. The seal 208 is captured between the angled seal surface 224 of the bonnet 204, an inside wall 232 of the valve body 202, and a surface 234 of the segmented ring 230. Alternatively, a backing ring may be included between the segmented ring 230 and the seal 208.

During assembly of the fluid valve 200, the nut 206 is tightened, which causes the angled seal surface 224 of the bonnet 204 and the surface 234 of the segmented ring 230 to wedge the seal 208 against the inside wall 232 of the valve body 202, thereby pre-loading the seal 208 and ensuring a tight seal against fluid leakage between the valve body 202 and the bonnet 204. The seal 208 depicted in FIG. 2 is referred to as a pressure-assisted seal because pressure from the fluid in the internal cavity 210 urges the bonnet 204 upwards in the orientation of FIG. 2, thereby imparting an increased compressive force against the seal 208. While the example depicted in FIG. 2 utilizes a pressure-assisted seal, other types of seals could be used instead.

The seal 208 has a central axis 236, which is coaxial to the longitudinal axis 214 of the bonnet 204 and coaxial to a central axis 238 of the nut 206. The bonnet 204 provides a pre-load force to the seal 208 when the bonnet 204 is coupled to the valve body 202 by the nut 206. Thus, the respective axes 214, 236 and 238 of the bonnet 204, the seal 208 and the nut 206 are coaxial. As a result, the pre-load force provided to the seal 208 by the nut 206 via the bonnet 204 is applied along these axes 214, 236, 238. Thus, because the seal 208 is ring-shaped about its central axis 236 and has a uniform cross-section, the pre-load force is applied uniformly to the entire seal 208. In contrast, many known fluid valves that utilize multiple fasteners to couple a bonnet to a valve body and pre-load a seal may provide uneven or asymmetric loading to the seal because the pre-load force is applied at various discrete locations other than along the central axis of the seal.

The valve body 202 includes an annular seating surface 240 to receive the nut 206. The annular seating surface 240 surrounds the neck portion 220 and is substantially planar such that a bottom face 242 of the nut 206 abuts the annular seating surface 240. The annular seating surface 240 may further define a plurality of locking bores 244 to receive a lock 246, which prevents the nut 206 from rotating with respect to the valve body 202, thereby preventing the nut/bonnet interface from loosening during operation. This ensures that the pre-load force applied to the seal 208 does not decrease over time. In one example, needle bearings may be included between the annular seating surface 240 of the valve body 202 and the bottom face 242 of the nut 206 to facilitate tightening and/or loosening of the nut 206 with respect to the valve body 202.

The nut 206 may include an actuator mounting pad 248 to which an actuator (not shown) may be mounted. The example actuator mounting pad 248 of FIG. 2 is annular in shape and is coaxial to the central axis 238 of the nut 206. The actuator mounting pad 248 is integral to the nut 206, extending upwards from a top surface 250 thereof. The actuator mounting pad 248 also defines two or more actuator mounting holes 252 spaced radially around the actuator mounting pad 248. These mounting holes 252 may be threaded to receive actuator mounting bolts (not shown). In one example, the actuator mounting pad 248 may be machined into the nut 206 or may be welded, bolted, or otherwise attached thereto. In other examples, the actuator mounting pad 248 may include discrete mounting bosses or standoffs, as opposed to being annular in shape. The mounting bosses or standoffs may accept threaded bolts or may be threaded so that actuator features fit over the bosses or standoffs and are retained by nuts. In other examples, the nut 206 may include the actuator mounting holes 252 without utilizing an actuator mounting pad 248 such that the actuator is mounted directly to the nut 206. In further examples, an actuator may be coupled directly to the neck portion 220 of the bonnet 204.

Figure 3:
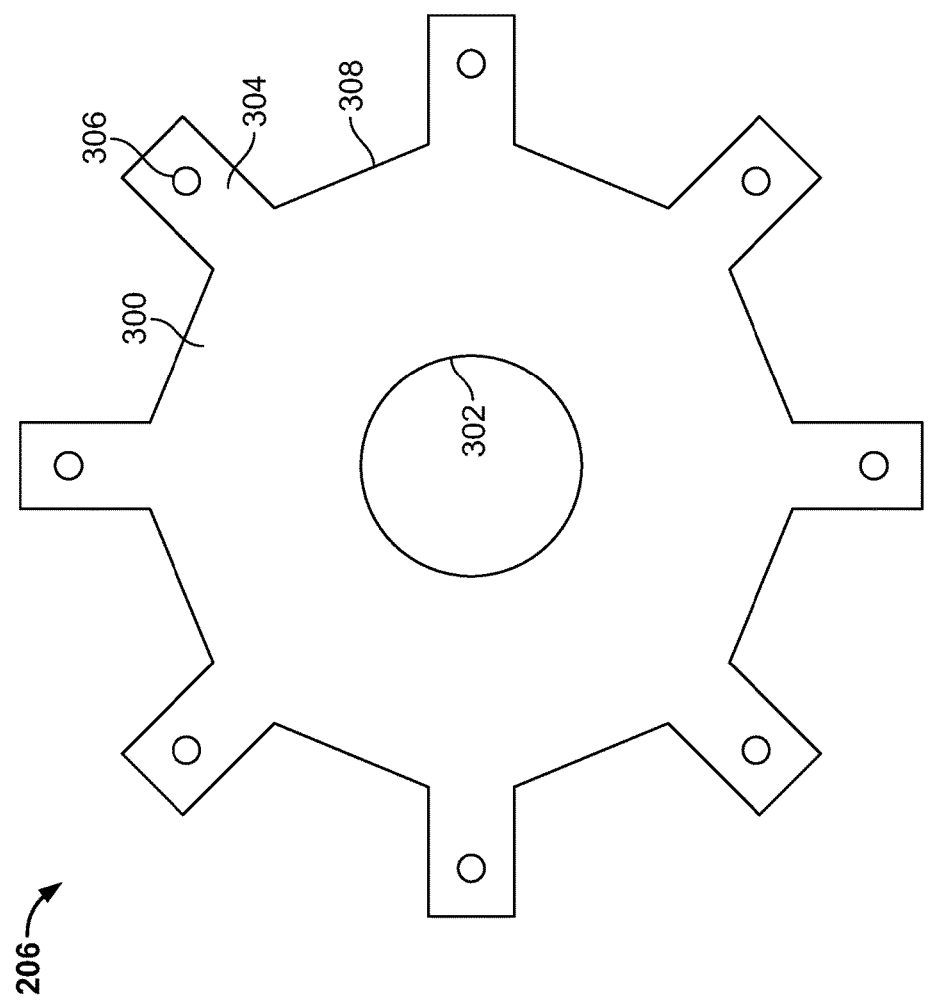
FIG. 3 is a plan view of the example nut of FIG. 2.

Turning now to FIG. 3, the nut 206 has a generally ring-shaped body portion 300 that defines an axial center bore 302 along its central axis 238 (FIG. 2) and arms 304 that extend radially from the body portion 300. The center bore 302 is sized to receive the neck portion 220 of the bonnet 204 such that the longitudinal axis 214 of the bonnet 204 is coaxial to the central axis 238 of the nut 206. The center bore 302 may include threads so that it may be threadably coupled to the neck portion 220 of the bonnet 204. Each of the arms 304 has an arm bore 306 that may receive the lock 246, such as a pin or a threaded bolt. In other examples, the nut 206 may not include arms, and the bores 306 may be defined by the body portion 300. In the example of FIG. 3, the arms 304 are substantially rectangular in cross-section and faces 308 between the arms 304 are substantially planar. In one example, the arms 304, the faces 308, the body portion 300 and/or the actuator mounting pad 248 may include a tool interface to facilitate the tightening of the nut 206 by utilizing, for example, an open-ended wrench, a spanner wrench, a hydraulic torque wrench, or other types of tools. For example, the body portion 300 and/or the actuator mounting pad 248 may include a tool interface having a raised hexagonal standoff to accept a driver of a hydraulic torque wrench. The nut 206 may be constructed of hardened steel or other metals.

The arms 304 of the nut 206 and the locking bores 244 of the valve body 202 are spaced to align an arm bore 306 and a locking bore 244, thereby enabling the nut 206 to be locked to the valve body 202 using a lock 246 inserted through the arm bore 306 and into the locking bore 244 at predetermined angular positions. More specifically, the locking bores 244 and the arm bores 306 are spaced such that at least one of the locking bores 244 aligns with one of the arm bores 306 when the nut 206 is rotated relative to the valve body 202 by a predetermined amount (e.g., a number of degrees) or multiples of the predetermined amount. In the example of FIG. 3, the arms 304 of the nut 206 and the corresponding arm bores 306 are radially spaced apart 45°, and the locking bores 244 of the valve body 202 are radially spaced apart 24°. In this configuration, an arm bore 306 of the nut 206 aligns with a corresponding locking bore 244 of the valve body 202 every 3° when the nut 206 is rotated with respect to the valve body 202. This relationship is illustrated in more detail in conjunction with FIG. 4 and Table 1 below.

Figure 4:
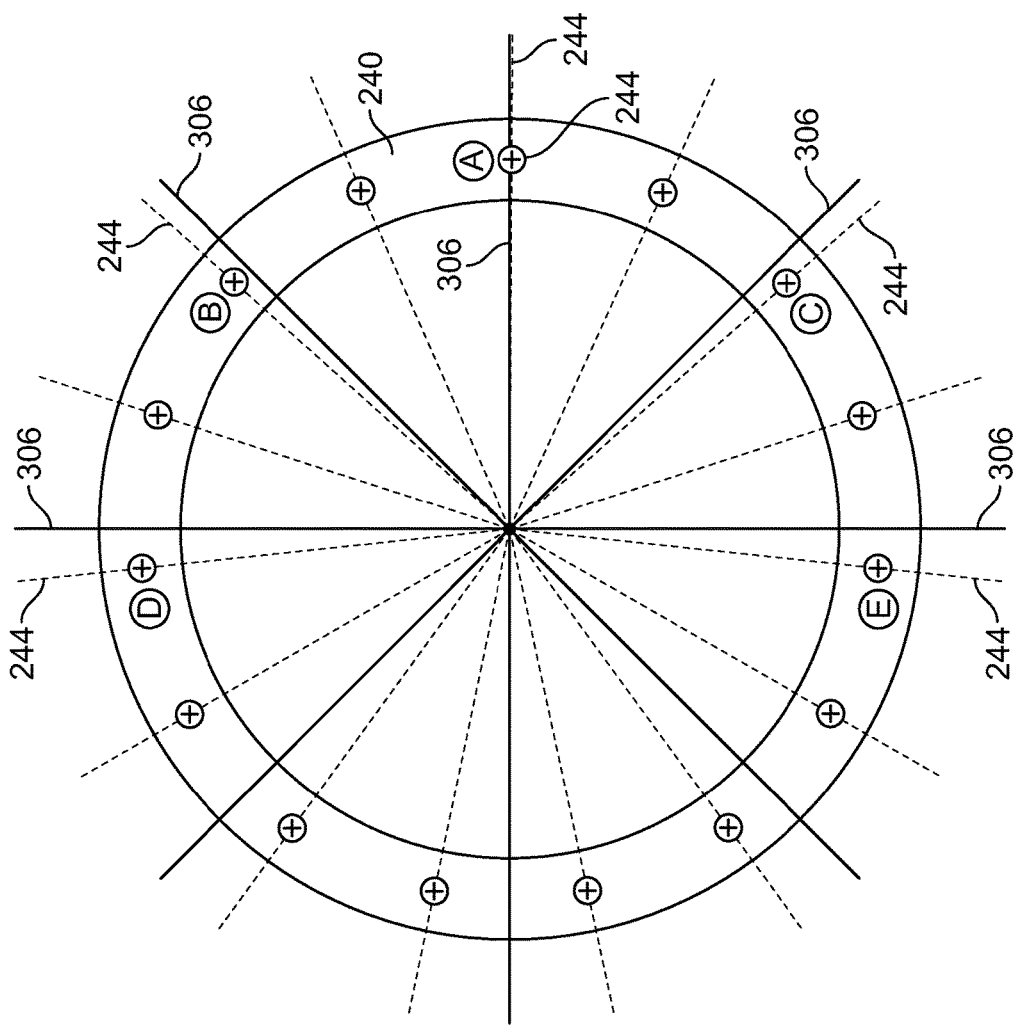
FIG. 4 is diagram illustrating example angular spacing between arm bores of a nut and locking bores of a valve body.

In FIG. 4, the solid lines are radially spaced at 45° intervals and correspond to the spacing between the arm bores 306. The dashed lines are radially spaced at 24° intervals and correspond to the spacing between the locking bores 244 on the annular seating surface 240. The angular spacing of each of the arm bores 306 and each of the locking bores 244 is listed in Table 1. At point A on FIG. 4, the nut 206 is initially spaced such that an arm bore 306 of the nut 206 and a locking bore 244 of the valve body 202 are aligned. This position can be considered 0°. In this position, the spacing of each of the arm bores 306 with respect to the locking bores 244 is as follows: at point B, the arm bore 306 at 45° is spaced 3° from the locking bore 244 at 48°; and at point C, the arm bore 306 at 315° is spaced 3° from the locking bore 244 at 312°. Thus, if the locking bore 244 is rotated counter-clockwise (in the orientation of FIG. 4) 3° with respect to the valve body 202, the arm bore 306 at 45° and the locking bore 244 at 48° align at point B, and a lock 246 can be inserted to lock the nut 206 at that location. Alternatively, if the locking bore 244 is rotated 3° clockwise with respect to the valve body 202, the arm bore 306 at 315° is aligned with the locking bore 244 at 312° at point C, and a lock 246 can be inserted to lock the nut 206 at that location. Similar spacing relationships exist at multiples of 3°, which is illustrated in the "spacing difference" column of Table 1 in conjunction with FIG. 4. For example, at point D on FIG. 4, the arm bore 306 at 90° is spaced 6° from the locking bore 244 at 96° and, at point E, the arm bore 306 at 270° is spaced 6° from the locking bore 244 at 264°.

TABLE 1

| Radial spacing between the arm bores 306 and the locking bores 244 | | | |
| --- | --- | --- | --- |
| Arm bore 306 spacing (deg.) | Locking bore 244 spacing (deg.) | Combined spacing (deg.) | Spacing difference (deg.) |
| 0 | 0 | 0 | 0 |
| 45 | 24 | 0 | 24 |
| 90 | 48 | 24 | 21 |
| 135 | 72 | 45 | 3 |
| 180 | 96 | 48 | 24 |
| 225 | 120 | 72 | 18 |
| 270 | 144 | 90 | 6 |
| 315 | 168 | 96 | 24 |
| 360 | 192 | 120 | 15 |
| | 216 | 135 | 9 |
| | 240 | 144 | 24 |
| | 264 | 168 | 12 |
| | 288 | 180 | 12 |
| | 312 | 192 | 24 |
| | 336 | 216 | 9 |
| | 360 | 225 | 15 |
| | | 240 | 24 |
| | | 264 | 6 |
| | | 270 | 18 |
| | | 288 | 24 |
| | | 312 | 3 |
| | | 315 | 21 |
| | | 336 | 24 |
| | | 360 | 0 |
| | | 360 | |

In another example, the arm bores 306 may be spaced apart every 40° and the locking bores 244 may be spaced apart every 18°, to provide alignment between an arm bore 306 and a locking bore 244 every 2°. In an additional example, the arm bores 306 may be spaced every 40° and the locking bores 244 may be spaced every 36° to provide alignment between an arm bore 306 and a locking bore 244 every 4°.

Although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. An apparatus, comprising:
   a bonnet for a fluid valve, the bonnet having a neck portion, the neck portion including a threaded outer surface; and
   a nut engaged with the neck portion of the bonnet to couple the bonnet to a body of the fluid valve, the nut having a central aperture with a threaded inner surface, wherein a central axis of the nut is coaxial to a longitudinal axis of the bonnet, wherein the threaded inner surface of the nut is threadably coupled to the threaded outer surface of the neck portion,
   wherein the nut further comprises a ring-shaped section with the threaded inner surface, and arms extending radially from the ring-shaped section, the arms each having first bores to receive a lock, and wherein the body of the fluid valve comprises second bores to receive the lock to prevent the nut from rotating relative to the body, wherein no more than one of the first bores is to align with any one of the second bores at any rotational position of the nut relative to the body.

2. The apparatus of claim 1, further comprising a seal engaged between the bonnet and the body of the valve, the seal receiving a pre-load force from the nut.

3. The apparatus of claim 2, wherein a central axis of the seal is coaxial to the central axis of the nut.

4. The apparatus of claim 2, wherein the engagement between the nut and the bonnet causes a segmented ring to compress the seal against a corresponding surface of the body to fluidly seal an internal cavity of the body.

5. The apparatus of claim 2, wherein the bonnet includes a flange portion having an angled sealing surface to contact an angled surface of the seal to engage the angled surface of the flange portion when the nut is coupled to the bonnet.

6. The apparatus of claim 5, wherein the seal has a triangular annular cross-section.

7. The apparatus of claim 2, further comprising an annular groove in the body, the annular groove adjacent an inner diameter of the body to receive a segmented ring to wedge the seal against the body of the fluid valve as the nut is tightened.

8. The apparatus of claim 1, wherein the lock comprises a pin.

9. The apparatus of claim 1, wherein the lock comprises a threaded bolt.

10. The apparatus of claim 1, wherein the first bores and the second bores are spaced such that one of the first bores aligns with one of the second bores when the nut is rotated relative to the body by a predetermined amount or a multiple of the predetermined amount.

11. The apparatus of claim 10, wherein the first bores are radially spaced apart a first amount and the second bores are spaced radially apart a second amount, the first amount different from the second amount such that the nut can be rotated incrementally and a lock can be disposed between the one of the first bores and the one of the second bores to lock the nut in an incremental position.

12. The apparatus of claim 11, wherein the nut can be locked in incremental positions radially spaced apart about 2 to 6 degrees.

13. The apparatus of claim 1, wherein the nut further comprises a tool interface to engage a tool to tighten the nut.

14. The apparatus of claim 1, wherein the first bores are spaced by a first predetermined amount and the second bores are spaced by a second predetermined amount smaller than the first amount.

15. The apparatus of claim 1, wherein a number of the arms is less than a number of the second bores.

16. An apparatus, comprising:
a bonnet for a fluid valve, wherein a neck portion of the bonnet includes a threaded outer surface;
a body of the fluid valve, the body having an annular seating surface surrounding the neck portion of the bonnet; and
a nut engaged with the bonnet to couple the bonnet to the body, wherein a face of the nut abuts the annular seating surface of the body, the nut having a central aperture with an inner threaded surface to be threadably coupled to the threaded outer surface, wherein the nut includes first bores to receive a lock,
wherein the nut further comprises a ring-shaped section with the inner threaded surface, and arms extending radially from the ring-shaped section, the arms having the first bores to receive the lock, wherein the body comprises second bores to receive the lock to prevent the nut from rotating relative to the body, wherein no more than one of the first bores is to align with any one of the second bores at any rotational position of the nut relative to the body.

17. The apparatus of claim 16, further comprising a seal engaged between the bonnet and the body, the seal receiving a pre-load force from the nut.

18. The apparatus of claim 17, wherein the nut is coaxial to a central axis of the seal.

19. The apparatus of claim 16, wherein the first bores and the second bores are spaced such that one of the first bores aligns with one of the second bores when the nut is rotated relative to the body by a predetermined amount.

20. An apparatus, comprising:
means for sealing a fluid valve; and
means for coupling a bonnet of the fluid valve to a body of the fluid valve, the means for coupling including a central aperture with interior threads to engage exterior threads of a neck portion of the bonnet, the means for coupling providing an axial pre-load force to the means for sealing, the axial pre-load force coaxial to a central axis of the means for sealing,
wherein the means for coupling further comprises a ring-shaped section with the interior threads, and arms extending radially from the ring-shaped section, the arms each having first bores to receive a locking means, and wherein the body of the fluid valve comprises second bores to receive the locking means to prevent the means for coupling the bonnet from rotating relative to the body, wherein no more than one of the first bores is to align with any one of the second bores at any rotational position of the means for coupling relative to the body.

21. The apparatus of claim 20, further comprising means for locking the means for coupling to the body.

22. The apparatus of claim 21, wherein the means for locking is configured to lock the means for coupling to the body when the means for coupling is rotated relative to the body by a predetermined amount or a multiple of the predetermined amount.

23. The apparatus of claim 21, wherein the means for locking comprises a pin.

24. The apparatus of claim 21, wherein the means for locking comprises a threaded bolt.

* * * * *